US012689867B2

(12) United States Patent
Zimmerman

(10) Patent No.: US 12,689,867 B2
(45) Date of Patent: Jul. 21, 2026

(54) AUDIO IMPULSE ORIGIN AND RESPONSE PATH SIMULATION

(71) Applicant: Microsoft Technology Licensing, LLC, Redmond, WA (US)

(72) Inventor: Sean Matthew Zimmerman, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 146 days.

(21) Appl. No.: 18/826,048

(22) Filed: Sep. 5, 2024

(65) Prior Publication Data

US 2026/0067635 A1     Mar. 5, 2026

(51) Int. Cl.
H04S 7/00          (2006.01)
G06T 7/55          (2017.01)

(52) U.S. Cl.
CPC .................. H04S 7/40 (2013.01); G06T 7/55 (2017.01); *G06T 2207/20081* (2013.01); *H04S 2420/01* (2013.01)

(58) Field of Classification Search
CPC .................................... H04S 7/40; G06T 7/55
See application file for complete search history.

(56) References Cited

U.S. PATENT DOCUMENTS 5,973,998 A * 10/1999 Showen ................ G01S 5/0036
                                                              367/129
7,688,679 B2 * 3/2010 Baxter ...................... G01S 5/22
                                                              367/128
9,886,833 B2 * 2/2018 Noland ................ G08B 29/183
10,586,109 B1 * 3/2020 Fowler .................... G06V 20/40
10,627,292 B1 * 4/2020 Fowler ...................... G01J 5/10
10,830,866 B1 * 11/2020 Onofrio .................... G01S 5/18
11,543,242 B2 * 1/2023 Petill ...................... G06T 19/006
12,063,491 B1 * 8/2024 Cosnefroy .............. H04R 3/04
12,536,692 B2 * 1/2026 Price ................... A63F 13/5255
(Continued)

OTHER PUBLICATIONS

Hewett, David., "Sound Propagation in an Urban Environment", In Thesis, Doctor of Philosophy, 2010, 244 pages.
(Continued)

*Primary Examiner* — Olisa Anwah
(74) *Attorney, Agent, or Firm* — Alleman Hall LLP

(57)          ABSTRACT

A method for estimating an origin of an audio impulse in a real-world environment performed by computing system is disclosed. Audio signals are received from a microphone array. The audio signals characterize an audio impulse generated in the real-world environment. Locations in the real-world environment of the plurality of microphones are received. A device related transfer function (DRTF) of the microphone array is recognized. A geometric computer model of the real-world environment is recognized. The geometric computer model includes virtual structures that model real-world structures in the real-world environment. The virtual structures include virtual surfaces that are assigned acoustic parameters. An impulse response path of the audio impulse throughout the geometric computer model of the real-world environment is simulated. Simulation data including an estimated origin of the audio impulse in the real-world environment is output based at least on the simulated impulse response path of the audio impulse.

20 Claims, 8 Drawing Sheets

(56) References Cited

U.S. PATENT DOCUMENTS

| | | | |
|---|---|---|---|
| 2012/0063270 A1 | 3/2012 | Angell | |
| 2012/0127308 A1 | 5/2012 | Eldershaw | |
| 2012/0275273 A1 | 11/2012 | Showen | |
| 2025/0347763 A1* | 11/2025 | Griggs | G01S 5/18 |

OTHER PUBLICATIONS

Khalid, et al., "Gunshot Detection and Localization using Sensor Networks", In Proceedings of the IEEE International Conference on Smart Instrumentation, Measurement and Applications, Nov. 2013, 6 pages.
Parker, et al., "Acoustic Wave Propagation in Urban Environments", In DoD High Performance Computing Modernization Program Users Group Conference, IEEE, Jun. 2007, 5 pages.

* cited by examiner

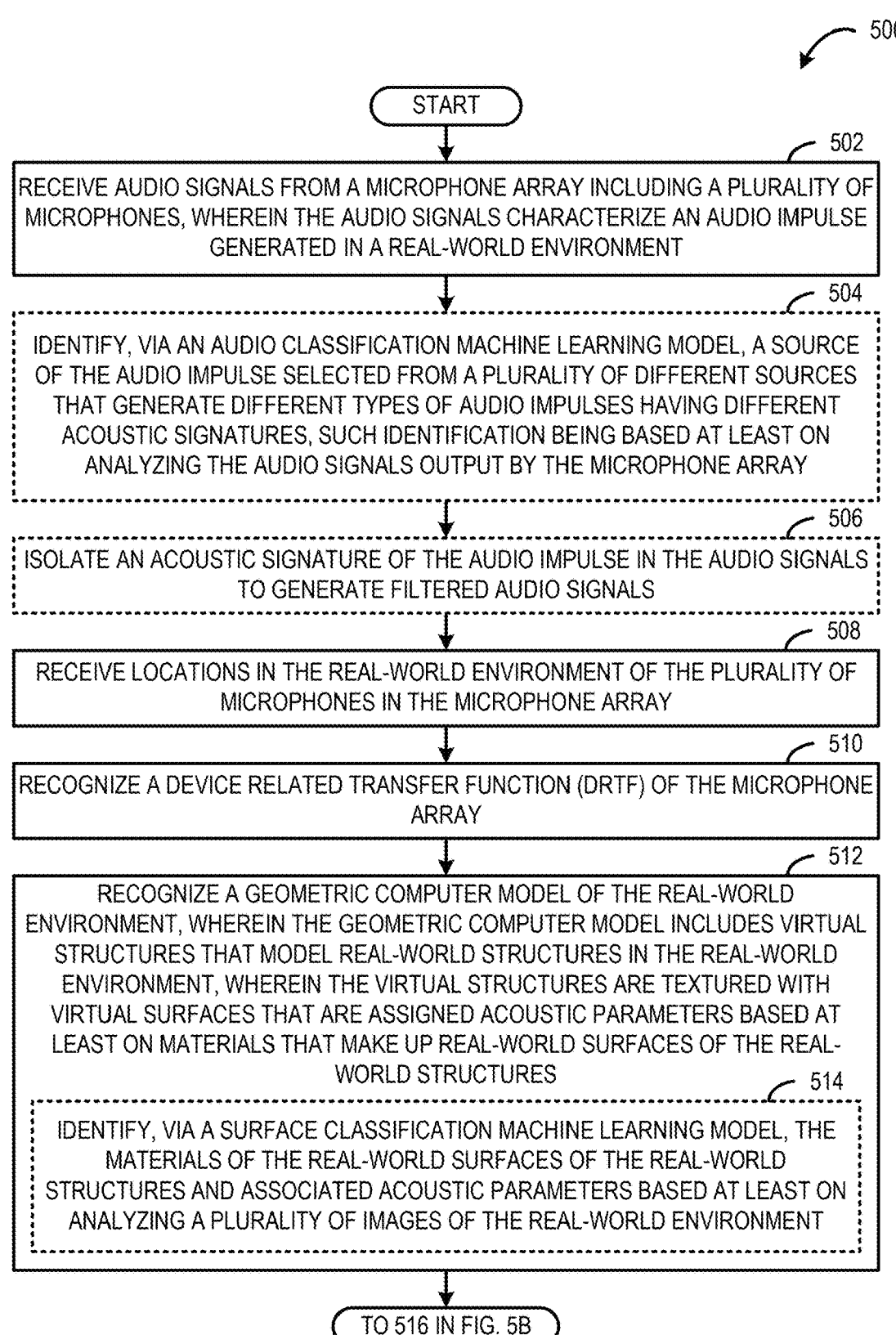

500

START

502

RECEIVE AUDIO SIGNALS FROM A MICROPHONE ARRAY INCLUDING A PLURALITY OF MICROPHONES, WHEREIN THE AUDIO SIGNALS CHARACTERIZE AN AUDIO IMPULSE GENERATED IN A REAL-WORLD ENVIRONMENT

504

IDENTIFY, VIA AN AUDIO CLASSIFICATION MACHINE LEARNING MODEL, A SOURCE OF THE AUDIO IMPULSE SELECTED FROM A PLURALITY OF DIFFERENT SOURCES THAT GENERATE DIFFERENT TYPES OF AUDIO IMPULSES HAVING DIFFERENT ACOUSTIC SIGNATURES, SUCH IDENTIFICATION BEING BASED AT LEAST ON ANALYZING THE AUDIO SIGNALS OUTPUT BY THE MICROPHONE ARRAY

506

ISOLATE AN ACOUSTIC SIGNATURE OF THE AUDIO IMPULSE IN THE AUDIO SIGNALS TO GENERATE FILTERED AUDIO SIGNALS

508

RECEIVE LOCATIONS IN THE REAL-WORLD ENVIRONMENT OF THE PLURALITY OF MICROPHONES IN THE MICROPHONE ARRAY

510

RECOGNIZE A DEVICE RELATED TRANSFER FUNCTION (DRTF) OF THE MICROPHONE ARRAY

512

RECOGNIZE A GEOMETRIC COMPUTER MODEL OF THE REAL-WORLD ENVIRONMENT, WHEREIN THE GEOMETRIC COMPUTER MODEL INCLUDES VIRTUAL STRUCTURES THAT MODEL REAL-WORLD STRUCTURES IN THE REAL-WORLD ENVIRONMENT, WHEREIN THE VIRTUAL STRUCTURES ARE TEXTURED WITH VIRTUAL SURFACES THAT ARE ASSIGNED ACOUSTIC PARAMETERS BASED AT LEAST ON MATERIALS THAT MAKE UP REAL-WORLD SURFACES OF THE REAL-WORLD STRUCTURES

514

IDENTIFY, VIA A SURFACE CLASSIFICATION MACHINE LEARNING MODEL, THE MATERIALS OF THE REAL-WORLD SURFACES OF THE REAL-WORLD STRUCTURES AND ASSOCIATED ACOUSTIC PARAMETERS BASED AT LEAST ON ANALYZING A PLURALITY OF IMAGES OF THE REAL-WORLD ENVIRONMENT

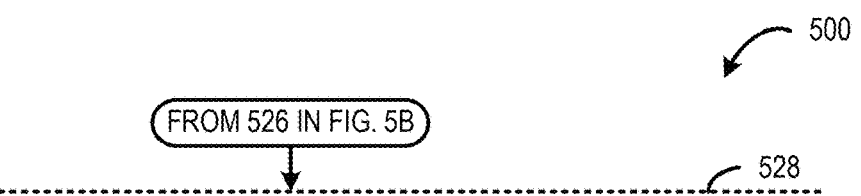

FROM 526 IN FIG. 5B

528

INSTANTIATE AN AUDIO IMPULSE LOCALIZATION APPLICATION PROGRAM THAT IS CONFIGURED TO 1) RECEIVE THE AUDIO SIGNALS, THE LOCATIONS OF THE PLURALITY OF MICROPHONES IN THE MICROPHONE ARRAY, AND THE DRTF OF THE MICROPHONE ARRAY, AND 2) CALCULATE AN ORIGIN OF THE AUDIO IMPULSE USING A TIME DIFFERENCE OF ARRIVAL (TDOA) ALGORITHM BASED AT LEAST ON THE AUDIO SIGNALS, THE LOCATIONS OF THE PLURALITY OF MICROPHONES IN THE MICROPHONE ARRAY, AND THE DRTF OF THE MICROPHONE ARRAY

532

BASED AT LEAST ON THE ESTIMATED OUTPUT OF THE AUDIO IMPULSE INCLUDED IN THE SIMULATION DATA MATCHING THE ORIGIN OF THE AUDIO IMPULSE CALCULATED BY THE AUDIO IMPULSE LOCALIZATION APPLICATION PROGRAM, OUTPUT A NOTIFICATION INDICATING THE ORIGIN OF THE AUDIO IMPULSE

534

BASED AT LEAST ON THE ESTIMATED OUTPUT OF THE AUDIO IMPULSE INCLUDED IN THE SIMULATION DATA DEVIATING FROM THE ORIGIN OF THE AUDIO IMPULSE CALCULATED BY THE AUDIO IMPULSE LOCALIZATION APPLICATION PROGRAM, OUTPUT A NOTIFICATION INDICATING THAT THE ORIGIN OF THE AUDIO IMPULSE CALCULATED BY THE AUDIO LOCALIZER APPLICATION PROGRAM IS ACTUALLY A REFLECTION OF THE AUDIO IMPULSE

RETURN

FIG. 5C

AUDIO IMPULSE ORIGIN AND RESPONSE PATH SIMULATION

BACKGROUND

Audio impulse localization systems can be employed to detect, classify, and locate audio impulses in an environment. For example, such audio impulses can be generated as a result of gun fire, explosions, or other events that can threaten public safety and security. Audio impulse localization systems can be used to enhance real-time situational awareness of first responders in conflict zones and high-risk areas in order to more effectively react to events that generate such audio impulses.

SUMMARY

A method for estimating an origin of an audio impulse in a real-world environment performed by computing system is disclosed. Audio signals are received from a microphone array including a plurality of microphones. The audio signals characterize the audio impulse generated in the real-world environment. Locations in the real-world environment of the plurality of microphones in the microphone array are received. A device related transfer function (DRTF) of the microphone array is recognized. A geometric computer model of the real-world environment is recognized. The geometric computer model includes virtual structures that model real-world structures in the real-world environment. The virtual structures include virtual surfaces that are assigned acoustic parameters based at least on materials that make up real-world surfaces of the real-world structures. An impulse response path of the audio impulse throughout the geometric computer model of the real-world environment is simulated based at least on the audio signals, the locations in the real-world environment of the plurality of microphones in the microphone array, and the DRTF of the microphone array. The impulse response path of the audio impulse is affected by interactions with different virtual surfaces in the geometric computer model based at least on the acoustic parameters of the different virtual surfaces. Simulation data including an estimated origin of the audio impulse in the real-world environment is output based at least on the simulated impulse response path of the audio impulse.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 5A, 5B, and 5C show an example method for estimating an origin of an audio impulse in a real-world environment performed by computing system.

DETAILED DESCRIPTION

Conventional audio impulse localization systems can be employed to detect, classify, and locate audio impulses in an environment. Typically, conventional audio impulse localization systems rely on acoustic sensors (e.g., microphones) to detect, classify, and locate audio impulses. However, in a crowded environment, such as an urban environment that has a large number of structures that are acoustically reflective, a conventional audio impulse localization system often miss-characterizes a reflection of an audio impulse as the audio impulse itself. Such miss-characterization results in the conventional audio impulse localization system outputting an inaccurate estimate of the origin point of the audio impulse due confusion with the reflections of the audio impulse in the crowded environment.

Accordingly, examples are disclosed that relate to methods for estimating an origin of an audio impulse in a real-world environment in a manner that is more accurate than conventional audio impulse localization system. In one example, audio signals are received from a microphone array including a plurality of microphones. The audio signals characterize the audio impulse generated in the real-world environment. Locations in the real-world environment of the plurality of microphones in the microphone array are received. A device related transfer function (DRTF) of the microphone array is recognized. A geometric computer model of the real-world environment is recognized. The geometric computer model includes virtual structures that model real-world structures in the real-world environment. The virtual structures include virtual surfaces that are assigned acoustic parameters based at least on materials that make up real-world surfaces of the real-world structures. An impulse response path of the audio impulse throughout the geometric computer model of the real-world environment is simulated based at least on the audio signals, the locations in the real-world environment of the plurality of microphones in the microphone array, and the DRTF of the microphone array. Simulation data including an estimated origin of the audio impulse in the real-world environment is output based at least on the simulated impulse response path of the audio impulse.

By simulating the impulse response path of the audio impulse throughout the geometric computer model of the real-world environment based at least on the audio signals of the microphone array that characterize the audio impulse, the origin of the audio impulse can be identified and differentiated from reflections of the audio impulse. This technical features provides a more accurate estimate of the origin of the audio impulse relative to a conventional audio impulse localization system that can be confused by reflections of an audio impulse causing the conventional audio impulse localization system to provide a less accurate estimate of the origin of the audio impulse.

Figure 1:
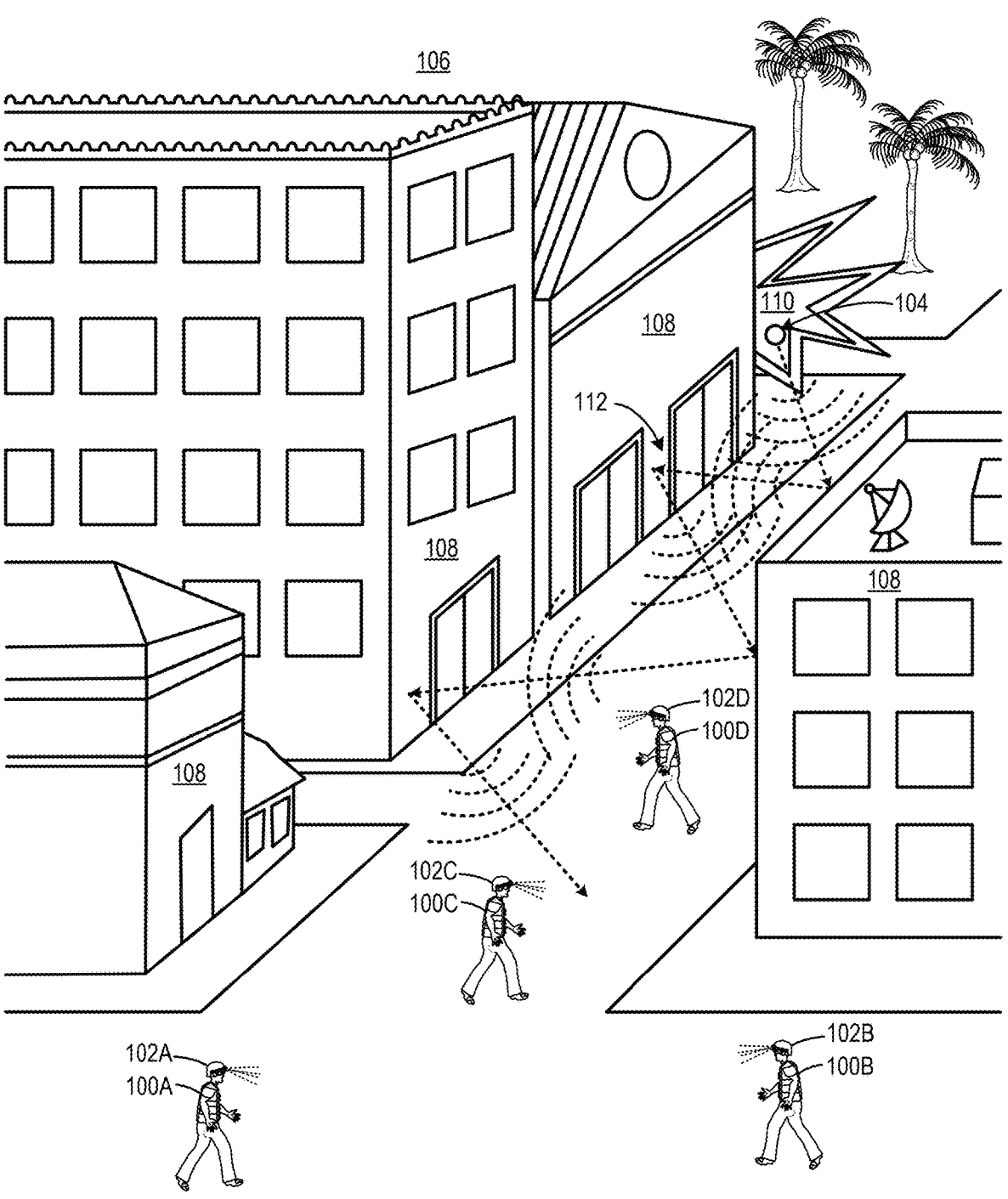
FIG. 1 shows an example scenario in which first responders utilize computing systems to estimate an origin of an audio impulse in a real-world environment, according to an implementation of the present disclosure.

FIG. 1 shows an example scenario in which first responders 100A, 100B, 100C, 100D utilize computing systems 102A, 102B, 102C, 102D to estimate an origin of an audio impulse 104 in a real-world environment 106, according to an implementation of the present disclosure. In the illustrated example, the real-world environment 106 is an urban environment, such as a city including a plurality of real-world structures 108 (e.g., buildings and other structures) situated along different city streets and city blocks.

The plurality of real-world structures 108 are constructed from different materials that have different acoustic characteristics. The acoustic characteristics of the different building materials cause sound waves that interact with the different materials to be modulated (e.g., reflected, absorbed, transmitted) differently. As one example, a building made predominantly of glass generally has a low attenuation coefficient and a high reflection coefficient meaning that glass absorbs very little sound energy and is an excellent reflector of sound waves. As another example, a building made predominantly of wood has a higher attenuation coefficient and a lower reflection coefficient relative to glass meaning that sound waves do not transmit or reflect as well through the wood relative to the glass. The real-world structures 108 may be made of any suitable materials having any suitable acoustic characteristics.

Typically, when an emergency event occurs in the real-world environment 106, the emergency event generates an audio impulse. An audio impulse is an audio signal that characterizes a transient sound that contains a certain range of frequencies. An audio impulse can be generated by any suitable emergency event, such as an explosion, gun fire, a car crash, a break-in, etc. Different audio impulses can be characterized as having different audio signatures that can be identified and differentiated from other types of audio impulses. Such acoustic signatures of different audio impulses can be classified with any suitable level of granularity. In some examples, an audio impulse can be classified as being generated by gun fire. In other examples, the audio impulse can be classified as being generated by gun fire from a particular type of gun.

In the illustrated example, an explosion 104 in the real-world environment 106 generates the audio impulse 104. The audio impulse 104 propagates throughout the real-world environment 106 along an impulse response path 112. The impulse response path 112 is affected by and includes all reflections, refractions, and absorptions that occur as the audio signal travels through the real-world environment 106. The impulse response path 112 of the audio impulse 104 is affected by the different materials of the real-world structures 108 in the real-world environment 106 that the audio impulse 104 interacts with. More particularly, the different acoustic characteristics of the different materials of the real-world structures 108 affect/change the impulse response path 112 by causing different reflections, refractions, and absorptions of the audio impulse 104 as it interacts with the different material surfaces of the buildings 108.

Typically, an impulse response path of an audio impulse that is generated in a crowded environment (e.g., densely filled with various structures) is more complex than an impulse response path of the same audio impulse that is generated in a sparse environment (e.g., an open field). For example, the complexity of the impulse response path can be increased via additions of reflections and reverberations. This is due to the audio impulse interacting with more structures in the crowded environment than in the sparse environment.

When an emergency event occurs in the real-world environment 106, the first responders 100A, 100B, 100C, 100D are dispatched to respond to the emergency event. The first responders 100A, 100B, 100C, 100D are essential to the immediate and effective management of emergencies. The first responders 100A, 100B, 100C, 100D roles can encompass a wide range of activities, from providing life-saving medical care to managing hazardous materials, combating hostile threats, and ensuring public safety. The ability of the first responders 100A, 100B, 100C, 100D to determine a location of an emergency event and respond to it in a timely manner is critical to protecting lives and property during emergencies.

Today, when first responders are dispatched to respond to an emergency event, in some examples, the first responders would use conventional audio impulse localization systems that rely on acoustic sensors (e.g., microphones) to detect, classify, and locate an origin of an audio impulse generated by an emergency event. However, in a crowded environment, the conventional audio impulse localization systems often mis-characterize a reflection of an audio impulse as the audio impulse itself. Such mis-characterization results in the conventional audio impulse localization systems outputting an inaccurate estimate of the origin point of the audio impulse due to confusion between the reflection of the audio impulse and the actual audio impulse in the crowded real-world environment. As such, in the illustrated example, it would be difficult for first responders to identify the location of an emergency event in the crowded environment due to the inaccurate output of the conventional audio impulse localization systems.

Accordingly, in the illustrated example, the first responders 100A, 100B, 100C, 100D utilize computing systems 102A, 102B, 102C, 102D that are configured to estimate the origin of the audio impulse 104 of the explosion 110 in the real-world environment 106 in a manner that is more accurate than conventional audio impulse localization systems. In the illustrated example, each of the computing systems 102A, 102B, 102C, 102D is a mobile computing device, and more particularly, a head-mounted device that comprises a microphone array 206 (shown in FIG. 2) including a plurality of microphones 208 that are fixed relative to each other. The microphone array 206 is configured to generate audio signals that characterize the audio impulse 104 generated by the explosion 110 in the real-world environment 106.

A device related transfer function (DRTF) 216 of the microphone array 206 (shown in FIG. 2) is recognized by the computing system. The DRTF 216 of the microphone array 206 describes how the microphones of the microphone array respond to sound sources from different directions and at different frequencies. The DRTF 216 characterizes the relationship between an input sound field (incident sound waves) and output signals (microphone array recordings). The DRTF 216 can be used to determine the direction of arrival of sound by analyzing the differences in the transfer functions of the microphones 208 of the microphone array 206.

Each of the computing systems 102A, 102B, 102C, 102D further comprises a location sensor 212 (shown in FIG. 2), such as a global positioning system (GPS) device, which is configured to determine a location 214 of the computing system. The locations of the plurality of microphones 208 in the microphone array 206 can be calculated from the location 214 output by the location sensor 212.

Each of the computing systems 102A, 102B, 102C, 102D is configured to execute a simulation engine 218 (shown in FIG. 2) that is configured to recognize a geometric computer model 220 (shown in FIG. 2) of the real-world environment 106. The geometric computer model 220 includes virtual structures 222 that model the real-world structures 108 in the real-world environment 106. The virtual structures 222 include virtual surfaces 224 that are assigned acoustic parameters 226 based at least on materials that make up real-world surfaces of the real-world structures 108. The simulation engine 218 is configured to simulate the impulse response path 112 of the audio impulse 104 throughout the geometric computer model 220 of the real-world environment 106 based at least on the audio signals 210 received from the microphone array 206, the locations 214 in the real-world environment 106 of the plurality of microphones 20 in the microphone array 206, and the DRTF 216 of the microphone array 206. The simulation engine 218 is configured to output simulation data 236 including an estimated origin 238 of the audio impulse 104 in the real-world environment 106 based at least on a simulated impulse response path 234 of the audio impulse 104.

By simulating the impulse response path 234 of the audio impulse 104 throughout the geometric computer model 220 of the real-world environment 106 based at least on the audio signals 210 of the microphone array 206 that characterize the audio impulse 104, the origin 238 of the audio impulse 104 can be accurately estimated and differentiated from reflections of the audio impulse 104. In this way, the simulation engine 218 provides a more accurate estimation of the origin 238 of the audio impulse 104 relative to an estimation output by a conventional audio impulse localization system that can be confused by reflections of the audio impulse 104 in the crowded real-world environment 106.

Each of the computing systems 102A, 102B, 102C, 102D further comprises a display 252 (shown in FIG. 2) that is configured to display a map 254 of the real-world environment 106. The map 252 indicates the estimated origin 238 of the audio impulse 104 in the real-world environment 106. For example, the origin 238 of the audio impulse 104 can be shown as a waypoint on the map 254. This allows for the first responders 100A, 100B, 100C, 100D to locate the explosion 110 and provide suitable assistance in a timely manner.

In some examples, each of the computing systems 102A, 102B, 102C, 102D is configured as an augmented-reality device, and the display 252 is a see-through display that is configured to display digital content that augments the first responder's view of the real-word environment 106. In one example, the display 252 is configured to show a virtual heads-up display (HUD) that is positioned in the line of sight of the first responder. The virtual HUD may include the map 252 indicating the origin 238 of the audio impulse as well as other simulation data 236 that is generated based at least on analysis of the audio signals 210. For example, the virtual HUD can indicate a source 244 of the audio impulse 104, which is the explosion 110 in the illustrated example. The simulation engine 218 may be configured to identify the source 244 based at least on analysis of an acoustic signature 246 of the audio impulse 104. By displaying the source 244 of the audio impulse 104 via the display 252, the first responder may be better prepared with how to respond to the emergency event once the first responder arrives at the origin 238 of the audio impulse 104, which is the location of the explosion 110 in the illustrated example.

The scenario illustrated in FIG. 1 is one example in which a computing system is configured to estimate an origin of an audio impulse in a real-world environment by simulating an impulse response path of the audio impulse throughout a geometric computer model of the real-world environment based at least on audio signals corresponding to the audio impulse. In the illustrated example, the computing systems 102A, 102B, 102C, 102D are configured as HMDs. In other implementations, the computing systems 102A, 102B, 102C, 102D may take other forms. Further, although the simulation of the impulse response path of the audio impulse is discussed in the context of the audio impulse being generated by an emergency event, the concepts of the present disclosure are broadly applicable to simulating an impulse path of any suitable audio impulse in any real-world environment.

Figure 2:
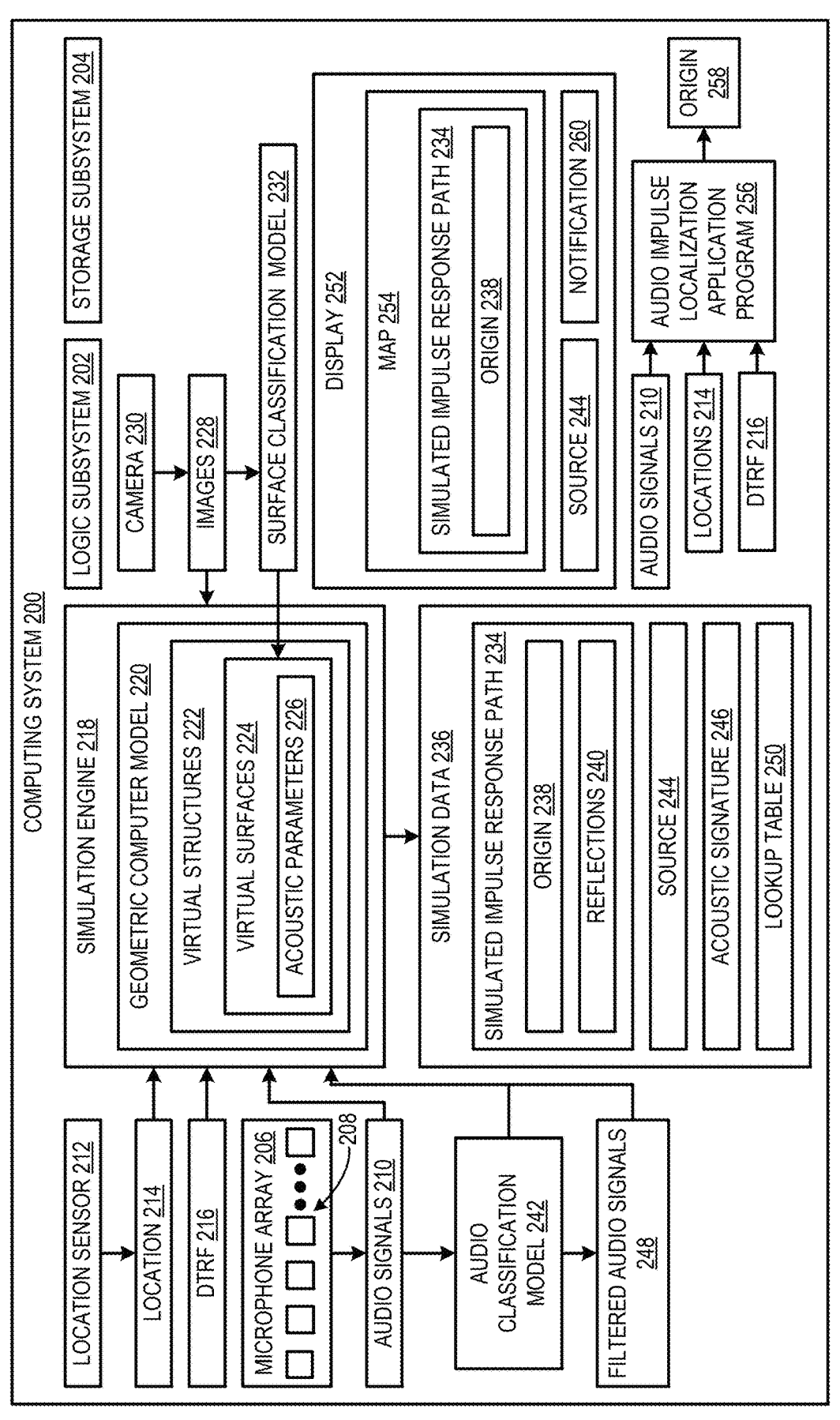
FIG. 2 shows an example computing system configured to estimate an origin of an audio impulse in a real-world environment.

FIG. 2 shows an example computing system 200 that is configured to estimate an origin of an audio impulse in a real-world environment, according to an implementation of the present disclosure. For example, the computing system 200 may correspond to any of the computing systems 102A, 102B, 102C, 102D shown in FIG. 1 or another computing system. The computing system 200 comprises a logic subsystem 202 and a storage subsystem 204. The storage subsystem 204 holds instructions that are executable by the logic subsystem 202 to perform computing operations relating to estimating an origin of an audio impulse in a real-world environment.

The computing system 200 comprises the microphone array 206 including the plurality of microphones 208. The plurality of microphones 208 are arranged in fixed positions relative to each other in the microphone array 206, such that the plurality of microphones 208 can capture audio signals from multiple directions. In one example, the microphone array 206 includes eight microphones. The microphone array 206 may include any suitable number of microphones.

The storage subsystem 204 holds instructions that are executable by the logic subsystem 202 to receive audio signals 210 from the plurality of microphones 208 of the microphone array 206. The audio signals 210 output by the microphones 208 of the microphone array 206 characterize an audio impulse generated in a real-world environment, such as the audio impulse 104 in the real-world environment 106 shown in FIG. 1.

The computing system comprises the location sensor 212 that is configured to output a location 214 of the computing system 200. In one example, the location 214 is represented by geographical coordinates of the location of the computing system 200. In one example, the location sensor 212 is a GPS device. In other examples, the location sensor 212 is another type of location sensor. The computing system 200 may comprise any suitable type of location sensor.

The storage subsystem 204 holds instructions that are executable by the logic subsystem 202 to receiving locations 214 in the real-world environment of the plurality of microphones 208 in the microphone array 206. In one example, the locations 214 of the plurality of microphones 208 in the microphone array 206 are calculated from the location 214 output by the location sensor 212.

The storage subsystem 204 holds instructions that are executable by the logic subsystem 202 to recognize the DRTF 216 of the microphone array 206. The DRTF 216 of the microphone array 206 describes how the microphones 208 of the microphone array 206 respond to sound sources from different directions and at different frequencies. The DRTF 216 characterizes the relationship between an input sound field (incident sound waves) and output signals (microphone array recordings).

In the illustrated implementation, the microphone array 206 is integrated into the computing system 200. In other implementations, the microphone array 206 may be integrated into one or more separate computing devices and/or one or more peripheral devices in communication with the computing system 200.

In some implementations, the microphone array 206 can include microphones that are included in a plurality of mobile computing devices having different real-world locations in the real world environment 106. Returning to the example scenario shown in FIG. 1, the computing systems 102A, 102B, 102C, 102D include microphone arrays that output audio signals, and the audio signals from the computing systems 102A, 102B, 102C, 102D and corresponding locations of the microphones can be aggregated to form an enhanced microphone array having a greater number of microphones than any single computing system. The greater number of audio signals output by the enhanced microphone array can provide higher spatial resolution and improved signal-to-noise ratio that allows for a more accurate estimation of the origin of the audio impulse to be determined based at least on analysis of the audio signals. In implementations where an enhanced microphone array is formed, the enhanced microphone array can include any suitable number of microphones integrated into any suitable number of devices.

The storage subsystem 204 holds instructions that are executable by the logic subsystem 202 to execute the simulation engine 218 that is configured to recognize the geometric computer model 220 of the real-world environment 106. In some examples, the simulation engine 218 is a game engine. In other examples, the simulation engine 218 is another type of software framework. The geometric computer model 220 simulates real-world conditions of the real-world environment 106, and more particularly simulates acoustic dynamics of sound wave in the real-world environment 106. In some examples, the geometric computer model 220 is a three-dimensional model.

The geometric computer model 220 includes virtual structures 222 that model real-world structures 108 in the real-world environment 106. The virtual structures 222 include virtual surfaces 224 that are assigned acoustic parameters 226 based at least on materials that make up real-world surfaces of the real-world structures 108. Example acoustic parameters 226 that can be assigned to the different materials include acoustic impedance, an attenuation coefficient, a reflection coefficient, a transmission coefficient, an absorption coefficient, and a loss factor, among other acoustic parameters.

Figure 3:
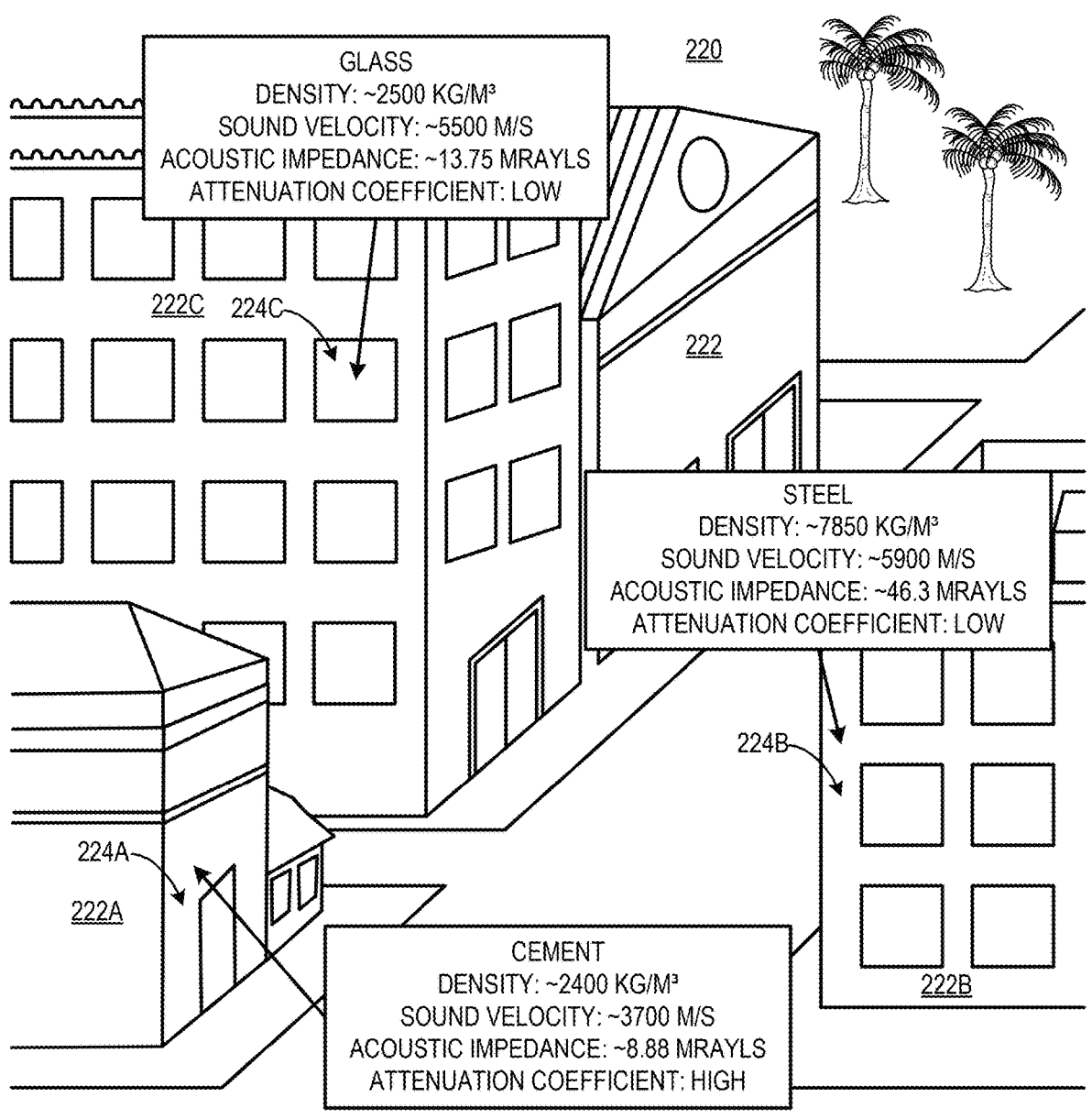
FIG. 3 shows aspects of an example geometric computer model of a real-world environment, according to an implementation of the present disclosure.

FIG. 3 shows the geometric computer model 220 of the real-world environment 106 shown in FIG. 1. The geometric computer model 220 includes virtual structures 222 that model real-world structures 108 in the real-world environment 106. The virtual structures 222 include virtual surfaces 224 that are assigned acoustic parameters 226 based at least on materials that make up real-world surfaces of the real-world structures 108. As one example, a first virtual structure 222A has a virtual surface 224A that is made of cement and thus is assigned acoustic parameters for cement (e.g., Density: ~2400 kg/m³, Sound Velocity: ~3700 m/s, Acoustic Impedance: ~8.88 MRAYLS, Attenuation Coefficient: high). As another example, a second virtual structure 222B has a virtual surface 224B that is made of steel and thus is assigned acoustic parameters for steel (e.g., Density: ~7850 kg/m³, Sound Velocity: ~5900 m/s, Acoustic Impedance: ~46.3 MRAYLS, Attenuation Coefficient: low). As yet another example, a third virtual structure 222C has a virtual surface 224C that is made of glass and thus is assigned acoustic parameters for glass (e.g., Density: ~2500 kg/m³, Sound Velocity: ~5500 m/s, Acoustic Impedance: ~13.35 MRAYLS, Attenuation Coefficient: low). Any virtual structure 222 in the geometric computer model 220 may have any suitable virtual surface that has any suitable acoustic parameters. In some examples, a virtual structure 222 may include a plurality of different virtual surfaces 224 (e.g., cement, glass, steel) having different acoustic parameters. The different acoustic parameters of the different virtual surfaces affect how an audio impulse travels throughout the geometric model and interacts with the different virtual surfaces that defines the impulse response path of the audio impulse.

The different types of virtual surfaces 224 affect the way sound waves interact with those virtual surface based on the acoustic parameters 226 of the virtual surfaces 224. As one example, a building made predominantly of glass generally has a low attenuation coefficient and a high reflection coefficient meaning that glass absorbs very little sound energy and is an excellent reflector of sound waves. As another example, a building made predominantly of wood has a higher attenuation coefficient and a lower reflection coefficient relative to glass meaning that sound waves do not transmit or reflect as well through the wood relative to the glass. The different acoustic parameters of the different virtual surfaces 224 affect/change the impulse response path 234 as the audio impulse propagates through the geometric model 220 of the real-world environment 106 and interacts with the different virtual surfaces 224. For example, some virtual surfaces may generate reflections of the audio impulse while other virtual surfaces may absorb sound waves of the audio impulse. The different types of virtual surfaces 224 may affect/change the audio impulse based on the acoustic parameters 226 of those virtual surfaces 224 in any suitable manner.

Returning to FIG. 2, in some implementations, the computing system 200 is configured to generate the geometric computer model 220. In such implementations, the computing system 200 may employ any suitable computer modeling algorithms/techniques to generate the geometric computer model 220. In other implementations, the geometric computer model 220 may be generated by another computing system and uploaded to the computing system 200, such that the simulation engine 218 can run simulations using the geometric computer model 220.

The geometric computer model 220 of the real-world environment 106 is generated based at least on a plurality of images 228 of the real-world environment 106. The plurality of images 228 may include any suitable types of images including visible light images, infrared or near-infrared images, depth images, hyperspectral images, and other types of images.

The computing system 200 may receive the plurality of images 228 of the real-world environment 106 from any suitable image source. In some implementations, the computing system 200 comprises a camera 230 that is configured to capture at least some of the plurality of images 228 of the real-world environment 106. Returning to the example scenario shown in FIG. 1, the computing systems 102A, 102B, 102C, 102D may comprise cameras that capture images of the real-world environment 106 as the first responders 100A, 100B, 100C, 100D move throughout the real-world environment 106. These images can be aggregated and collectively used to generate the geometric computer model 220.

In some implementations, at least some of the images 228 of the real-world environment 106 may be received from a camera integrated into a different device. As one example, the plurality of images 228 can include satellite images of the real world environment 106 that are captured by a camera integrated into a satellite or a high-altitude aircraft. As another example, the plurality of images 228 can include images of the real world environment 106 that are captured by a camera integrated into a vehicle (e.g., a car, a drone) that moves throughout the real-world environment 106. The plurality of images 228 can include images captured by any suitable type of camera that can be stand alone or integrated into any suitable device.

In some implementations, the storage subsystem 204 holds instructions that are executable by the logic subsystem 202 to execute a surface classification machine learning model 232 that is configured to identify the materials of the real-world surfaces of the real-world structures 108 and associated acoustic parameters 226 based at least on analyzing the plurality of images 228 of the real-world environment 106. The surface classification machine learning model 232 is configured to map the acoustic parameters 226 of the materials of the real-world surfaces of the real-world structures 108 to the virtual surfaces 224 of the virtual structures 222 in the geometric computer model 220. The surface classification machine learning model 232 may be any suitable type of machine learning model. In some examples, the surface classification machine learning model 232 is a neural network, such as a convolutional neural network. In some examples, the surface classification machine learning model 232 is trained based at least on images of structures that are labeled with materials and associated acoustic parameters.

The simulation engine 218 is configured to simulate an impulse response path 234 of the audio impulse 104 throughout the geometric computer model 220 of the real-world environment 106 based at least on the audio signals 210, the locations 214 in the real-world environment 106 of the plurality of microphones 208 in the microphone array 206, and the DRTF 216 of the microphone array. The simulated impulse response path 234 is a representation of how the audio impulse 104 propagates through the real-world environment 106 from its origin to the microphones 208 of that microphone array 206 including all reflections, absorptions, and diffractions it encounters along the way. The impulse response path 234 is simulated based at least on interactions of the audio impulse 104 (and reflections of the audio impulse 104) with the virtual surfaces 224, wherein the interactions are affected by the acoustic parameters 226 of the virtual surfaces 224.

The simulation engine 218 is configured to output simulation data 236 based at least on simulating the impulse response path 234 of the audio impulse 104 in the geometric computer model 220 of the real-world environment 106. The simulation data 236 includes the simulated impulse response path 234 including the estimated origin 238 of the audio impulse 104 in the real-world environment 106. The simulated impulse response path 234 of the audio impulse 104 includes reflections 240 of the audio impulse 104 off virtual structures 222 in the geometric computer model 220 of the real-world environment 106.

The simulation engine 218 may employ any suitable techniques/algorithms to simulate the impulse response path 234 of the audio impulse 104 throughout the geometric computer model 220 of the real-world environment 106. For example, the simulation engine 218 may be configured to estimate the origin 238 of the audio impulse 104 by analyzing the time difference of arrival (TDOA) of sound waves at different microphones 208 in the microphone array 206 based at least on the audio signals 210 and the DRTF 216 while recognizing and distinguishing reflections from the direct path of the audio impulse 104.

In some implementations, the simulation engine 218 may be implemented as a machine learning model that is configured to receive the audio signals 210, the locations 214 in the real-world environment 106 of the plurality of microphones 208 in the microphone array 206, and the DRTF 216 of the microphone array as input and output the simulation data 236. The machine learning model may be trained based at least on labeled training data that includes impulse response paths of actual audio impulses having different acoustic signatures in different real-world environments.

In some implementations, the storage subsystem 204 holds instructions that are executable by the logic subsystem 202 to execute an audio classification machine learning model 242 that is configured to identify a source 244 of the audio impulse 104 selected from a plurality of different sources that generate different types of audio impulses having different acoustic signatures based at least on analyzing the audio signals 210 output by the microphone array 206. For example, the audio classification machine learning model 242 may classify an audio impulse as being generated by an explosion versus a gun shot, or a car crash, or a broken window. In some implementations, the audio classification machine learning model 242 is configured to identify a type of gun that fired a shot that generated an audio impulse based at least on the acoustic signature of the audio impulse. Further, the audio classification machine learning model 242 may be configured to distinguish between different gun shots fired by different guns (or other weapons) based at least on the acoustic signature of the audio impulse.

In some implementations, the audio classification machine learning model 242 is configured to output the identified source 244 of the audio impulse and an acoustic signature 246 of the audio impulse to the simulation engine 218. The simulation 218 is configured to simulate the impulse response path 234 of the audio impulse based at least on the acoustic signature 246 of the audio impulse generated by the source 244. The simulation engine is configured to output the source 244 and the acoustic signature 244 as part of the simulation data 236.

In some implementations, the audio classification machine learning model 242 is configured to isolate the acoustic signature 246 of the audio impulse in the audio signals 210 to generate filtered audio signals 248. The audio classification machine learning model 242 is configured to output the filtered audio signals 248 to the simulation engine 218. The simulation engine is configured to simulate the impulse response path 234 of the audio impulse based at least on the filtered audio signals 248. By isolating the audio signature of the audio impulse from other audio signals in the filtered audio signals 248, the signal-to-noise ratio of the filtered audio signals 248 may be increased that allows for the simulation engine 218 to simulate the impulse response path 234 of the audio impulse more accurately relative to using audio signals that include additional background noise.

In some implementations, the simulation engine 218 is configured to simulate the impulse response path 234 of the audio impulse in substantially real-time to estimate the origin 238 of the audio impulse. In other implementations, the simulation engine 218 is configured to simulate impulse response paths of different audio impulses in the real-world environment 106 offline and store the simulation data 236 in a lookup table 250. The lookup table 250 maps audio signals 210 characterizing the audio impulse, the locations 214 in the real-world environment 106 of the plurality of microphones 208 in the microphone array 206, and the DRTF 216 of the microphone array 206 to the estimated origin 238 of the audio impulse in the real-world environment 106. By running simulations with numerous different conditions and scenarios using different audio impulses in the real-world environment 106 offline and storing the simulation data in 236 in the lookup table 250, a computing system having constrained processing resources can estimate an origin of an audio impulse without having to simulate the response path of the audio impulse in real-time.

In some implementations, the computing system 200 comprises a display 252 that is configured to display the simulation data 236 to the first responder. More particularly, the storage subsystem 204 holds instructions that are executable by the logic subsystem 202 to display a map 254 of the real-world environment 106 via the display 252. The map 254 indicates the estimated origin 238 of the audio impulse in the real-world environment 106. In some implementations, the storage subsystem 204 holds instructions that are executable by the logic subsystem 202 to display the source 244 of the audio impulse so that the first responder can be prepared to deal with whatever emergency event is caused by the source 244. Returning to the example shown in FIG. 1, if the first responders 100A, 100B, 100C, 100D know that the source of the audio impulse 104 is the explosion 110, the first responders 100A, 100B, 100C, 100D can be prepared to put out any fires or care for any wounded as a result of the explosion 110.

Figure 4:
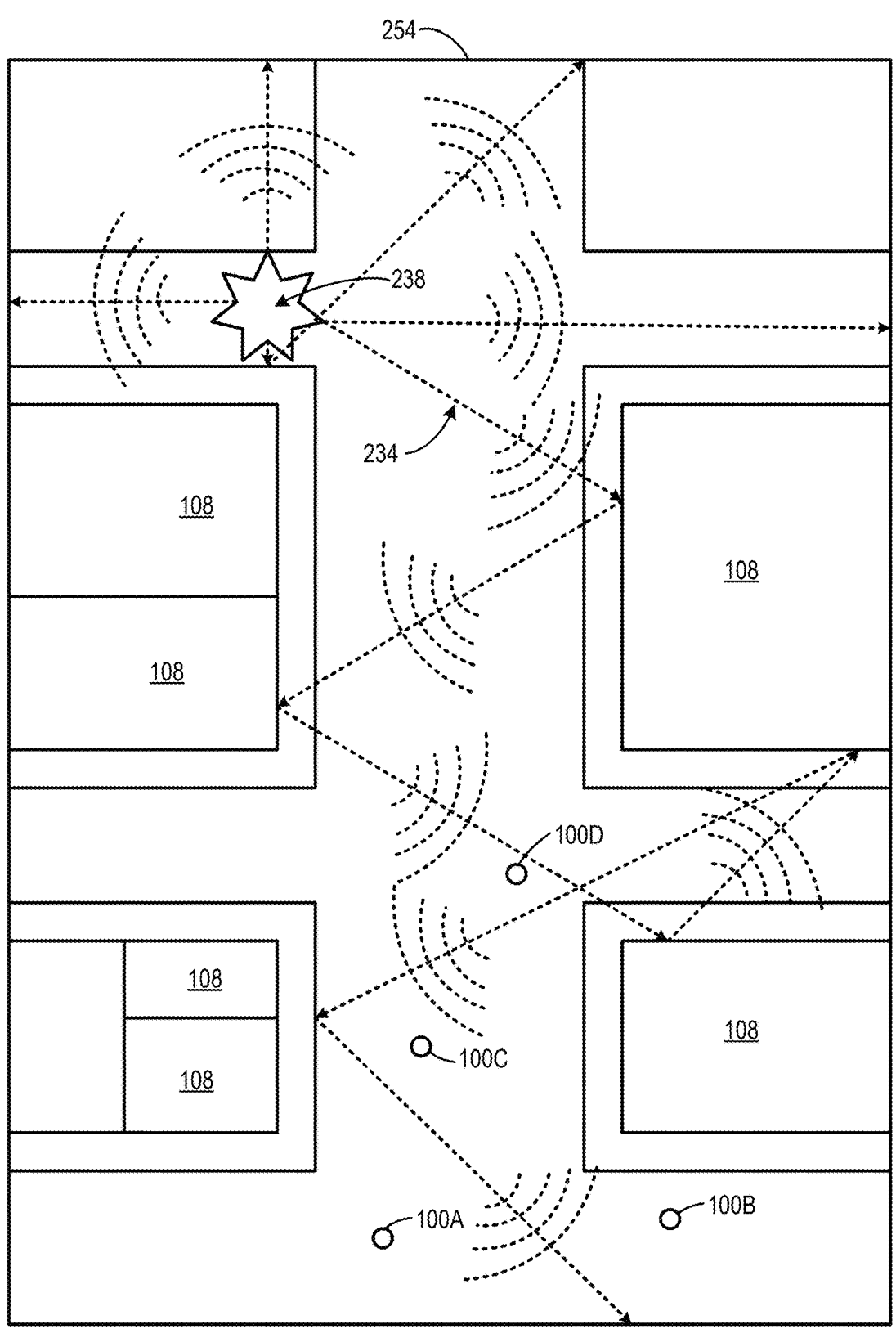
FIG. 4 shows an example map of a simulated impulse response path of an audio impulse in a real-world environment that is displayed by a computing system.

FIG. 4 shows the map 254 of the simulated impulse response path 234 of the audio impulse 104 in the real-world environment 106 that is displayed by the computing system 200. In the illustrated example, the map 254 is an overhead view of the real-world environment 106. In other examples, the map 254 may take a different form, such as three-dimensional view. The map 254 includes visual representations of the real-world structures 108, the simulated impulse response path 234 of the audio impulse 104, and the estimated origin 238 of the audio impulse 104. The map 254 further includes visual representations of the first responders 100A, 100B, 100C, 100D. In some implementations, the simulated impulse response path 234 of the audio impulse 104 may be omitted from the map 254 and just the origin 238 may be included for purposes of clarity and simplicity.

In some implementations, the simulation data 236 may be displayed via the display 252 in other formats. As one example where the computing system 200 is an augmented-reality device and the display 252 is a see-through display, the real-world location of the estimated origin 238 may be indicated with digital content (e.g., a beacon, waypoint, or other highlighting) in the see-through display. The simulation data 236 may be displayed via the display 252 in any suitable format.

In some implementations, the computing system 200 is configured to instantiate an audio impulse localization application program 256 that is configured to receive the audio signals 210, the locations 214 of the plurality of microphones in the microphone array, and the DRTF 216 of the microphone array 206, and calculate an origin 258 of the audio impulse 104 using a time difference of arrival (TDOA) algorithm based at least on the audio signals 210, the locations 214 of the plurality of microphones in the microphone array, and the DRTF 216 of the microphone array 206. The audio impulse localization application program 256 operates conventionally in that it does not simulate the impulse response path of the audio impulse. The storage subsystem 204 holds instructions executable by the logic subsystem 202 to output a notification 260 indicating the origin 238 of the audio impulse 104 based at least on the estimated output 238 of the audio impulse 104 included in the simulation data 236 matching the origin 258 of the audio impulse 104 calculated by the audio impulse localization application program 256. Further, the storage subsystem 204 holds instructions executable by the logic subsystem 202 to output a notification 260 indicating that the origin 258 of the audio impulse 104 calculated by the audio impulse localization application program 256 is actually a reflection of the audio impulse 104.

By employing both the conventional audio impulse localization program 256 and the simulation engine 218 to estimate the origin of the audio impulse, the computing system 200 may be made more robust and redundant in case one or the other encounter operational issues.

The computing system 200 is configured to estimate the origin of the audio impulse by simulating the impulse response path of the audio impulse in a geometric model of the real-world environment. In some implementations, the computing system 200 may be configured to operate in a centralized computing architecture where the computing system 200 receives sensor signals from different mobile computing devices that have microphone arrays and locations sensors and the computing system 200 provides the processing resources to simulate the impulse response path 234 of the audio impulse in order to estimate the origin of the audio impulse in the real-world environment. In such a scenario, the computing system 200 may operate as a cloud computing system or a centralized server computing system.

In other implementations, the computing system may be configured to operate in a distributed computing architecture, where the computing system 200 is a mobile computing system that comprises on-board sensors and simulates the impulse response path 234 of the audio impulse locally in order to estimate the origin of the audio impulse in the real-world environment. In such a scenario, the computing system 200 may share sensor information and/or the estimated origin of the audio impulse with other proximate mobile computing devices in the real-world environment to increase overall robustness and redundancy of the computing systems.

Figure 5B:
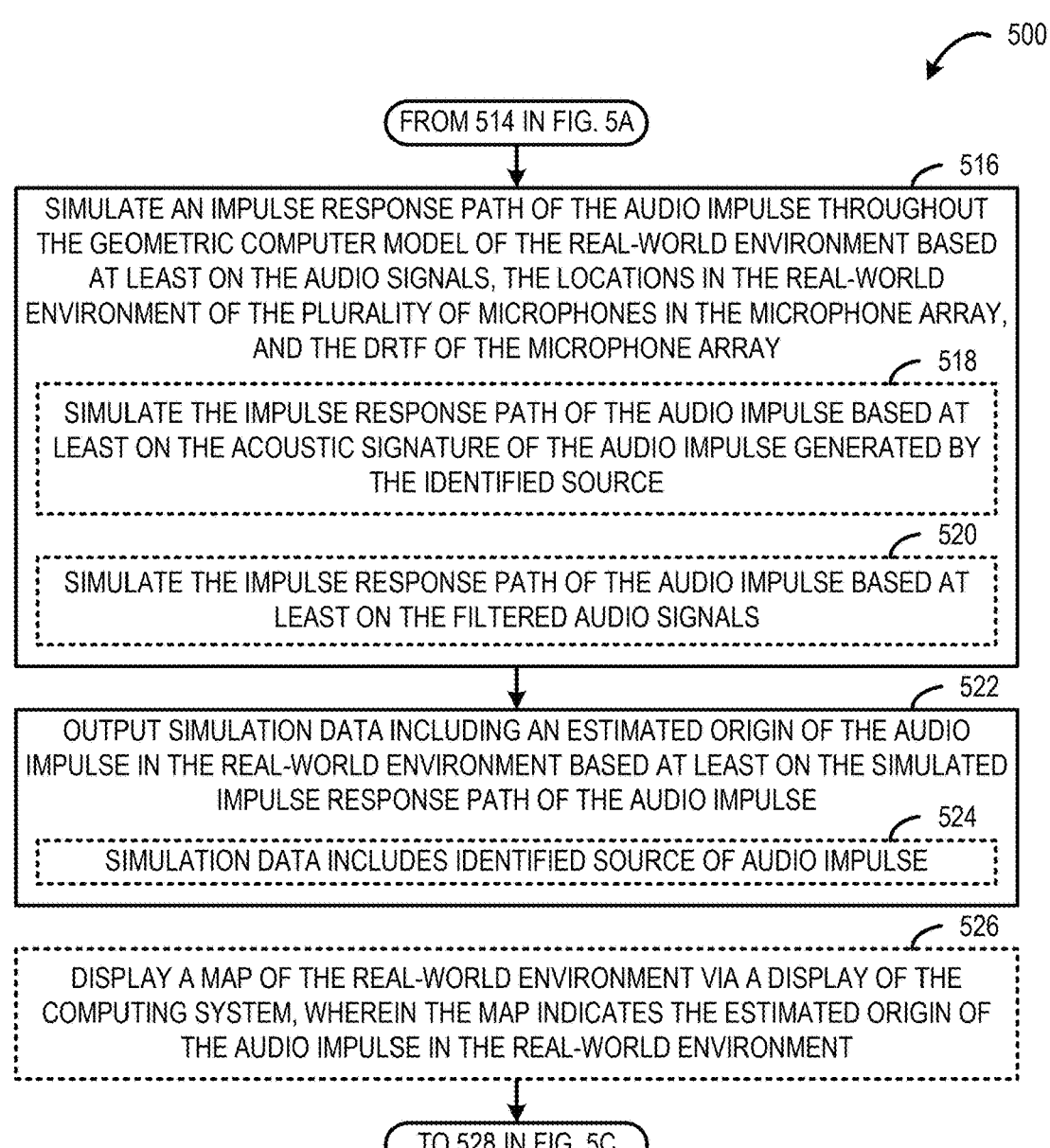

FIGS. 5A, 5B, and 5C show an example method 500 for estimating an origin of an audio impulse in a real-world environment performed by computing system. For example, the method 500 may be performed by the computing systems 102A, 102B, 102C, 102D shown in FIG. 1, the computing system 200 shown in FIG. 2, or another suitable computing system. Note that method steps indicated in dotted lines optionally may be performed in some implementations, In FIG. 5A, at 502, the method 500 includes receiving audio signals from a microphone array including a plurality of microphones, wherein the audio signals characterize an audio impulse generated in a real-world environment.

In some implementations, at 504, the method 500 may include identifying, via an audio classification machine learning model, a source of the audio impulse selected from a plurality of different sources that generate different types of audio impulses having different acoustic signatures, such identification being based at least on analyzing the audio signals output by the microphone array.

In some implementations, at 506, the method 500 may include isolating an acoustic signature of the audio impulse in the audio signals to generate filtered audio signals.

At 508, the method 500 includes receiving locations in the real-world environment of the plurality of microphones in the microphone array.

At 510, the method 500 includes recognizing a device related transfer function (DRTF) of the microphone array.

At 512, the method 500 includes recognizing a geometric computer model of the real-world environment, wherein the geometric computer model includes virtual structures that model real-world structures in the real-world environment, wherein the virtual structures include virtual surfaces that are assigned acoustic parameters based at least on materials that make up real-world surfaces of the real-world structures.

In some implementations, at 514, the method 500 may include identifying, via a surface classification machine learning model, the materials of the real-world surfaces of the real-world structures and associated acoustic parameters of the based at least on analyzing the plurality of images of the real-world environment.

In FIG. 5B, at 516, the method 500 includes simulating an impulse response path of the audio impulse throughout the geometric computer model of the real-world environment based at least on the audio signals, the locations in the real-world environment of the plurality of microphones in the microphone array, and the DRTF of the microphone array, wherein the impulse response path of the audio impulse is affected by interactions with different virtual surfaces in the geometric computer model based at least on the acoustic parameters of the different virtual surfaces.

In some implementations where the source of the audio impulse is identified, at 518, the method 500 may include simulating the impulse response path of the audio impulse based at least on the acoustic signature of the audio impulse generated by the identified source.

In some implementations where the filtered audio signals are generated, at 520, the method 500 may include simulating the impulse response path of the audio impulse based at least on the filtered audio signals.

At 522, the method 500 includes outputting simulation data including an estimated origin of the audio impulse in the real-world environment based at least on the simulated impulse response path of the audio impulse In some implementations, at 524, the simulation data may include the identified source of the audio impulse.

In some implementations, at 526, the method 500 may include displaying a map of the real-world environment via a display of the computing system, wherein the map indicates the estimated origin of the audio impulse in the real-world environment.

In FIG. 5C, in some implementations, at 528, the method 500 may include instantiating an audio impulse localization application program that is configured to 1) receive the audio signals, the locations of the plurality of microphones in the microphone array, and the DRTF of the microphone array, and 2) calculate an origin of the audio impulse using a time difference of arrival (TDOA) algorithm based at least on the audio signals, the locations of the plurality of microphones in the microphone array, and the DRTF of the microphone array.

In some implementations, at 530, the method 500 may include based at least on the estimated output of the audio impulse included in the simulation data matching the origin of the audio impulse calculated by the audio impulse localization application program, outputting a notification indicating the origin of the audio impulse; and In some implementations, at 532, the method 500 may include based at least on the estimated output of the audio impulse included in the simulation data deviating from the origin of the audio impulse calculated by the audio impulse localization application program, outputting a notification indicating that the origin of the audio impulse calculated by the audio localizer application program is actually a reflection of the audio impulse.

The method 500 may be performed to estimate an origin of an audio impulse in a real-world environment in a manner that is more accurate than conventional audio impulse localization system. By simulating the impulse response path of the audio impulse throughout the geometric computer model of the real-world environment based at least on the audio signals of the microphone array that characterize the audio impulse, the origin of the audio impulse can be identified and differentiated from reflections of the audio impulse. This technical features provides a more accurate estimate of the origin of the audio impulse relative to a conventional audio impulse localization system that can be confused by reflections of an audio impulse causing the conventional audio impulse localization system to provide a less accurate estimate of the origin of the audio impulse.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 6:
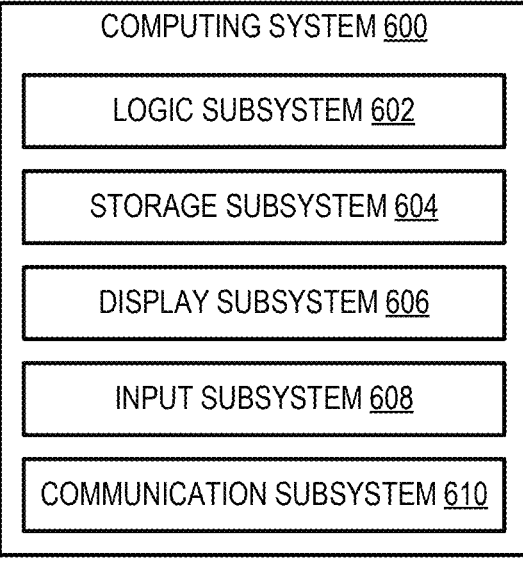
FIG. 6 shows an example computing system.

FIG. 6 schematically shows a simplified representation of a computing system 600 configured to provide any to all of the compute functionality described herein. Computing system 600 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices. For example, the computing system 200 may correspond to the computing systems 102A, 102B, 102C, 102D shown in FIG. 1 and the computing system 200 shown in FIG. 2.

Computing system 600 includes a logic subsystem 602 and a storage subsystem 604. Computing system 600 may optionally include a display subsystem 606, input subsystem 608, communication subsystem 610, and/or other subsystems not shown in FIG. 6.

Logic subsystem 602 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally, or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 604 includes one or more physical devices configured to temporarily and/or permanently hold computer information such as data and instructions executable by the logic subsystem. When the storage subsystem includes two or more devices, the devices may be collocated and/or remotely located. Storage subsystem 604 may include volatile, nonvolatile, dynamic, static, read/write, read-only, random-access, sequential-access, location-addressable, file-addressable, and/or content-addressable devices. Storage subsystem 604 may include removable and/or built-in devices. When the logic subsystem executes instructions, the state of storage subsystem 604 may be transformed—e.g., to hold different data.

Aspects of logic subsystem 602 and storage subsystem 604 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

Machines may be implemented using any suitable combination of state-of-the-art and/or future machine learning (ML), artificial intelligence (AI), and/or natural language processing (NLP) techniques. Non-limiting examples of techniques that may be incorporated in an implementation of one or more machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, and/or super-segmental models (e.g., hidden dynamic models)).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

When included, display subsystem 606 may be used to present a visual representation of data held by storage subsystem 604. This visual representation may take the form of a graphical user interface (GUI). Display subsystem 606 may include one or more display devices utilizing virtually any type of technology. In some implementations, display subsystem may include one or more virtual-, augmented-, or mixed reality displays.

When included, input subsystem 608 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 610 may be configured to communicatively couple computing system 600 with one or more other computing devices. Communication subsystem 610 may include wired and/or wireless communication devices compatible with one or more different communication protocols. The communication subsystem may be configured for communication via personal-, local- and/or wide-area networks.

In an example, a method for estimating an origin of an audio impulse in a real-world environment performed by computing system comprises receiving audio signals from a microphone array including a plurality of microphones, wherein the audio signals characterize the audio impulse generated in the real-world environment, receiving locations in the real-world environment of the plurality of microphones in the microphone array, recognizing a device related transfer function (DRTF) of the microphone array, recognizing a geometric computer model of the real-world environment, wherein the geometric computer model includes virtual structures that model real-world structures in the real-world environment, wherein the virtual structures include virtual surfaces that are assigned acoustic parameters based at least on materials that make up real-world surfaces of the real-world structures, simulating an impulse response path of the audio impulse throughout the geometric computer model of the real-world environment based at least on the audio signals, the locations in the real-world environment of the plurality of microphones in the microphone array, and the DRTF of the microphone array, wherein the impulse response path of the audio impulse is affected by interactions with different virtual surfaces in the geometric computer model based at least on the acoustic parameters of the different virtual surfaces, and outputting simulation data including an estimated origin of the audio impulse in the real-world environment based at least on the simulated impulse response path of the audio impulse. In this example and/or other examples, the geometric computer model of the real-world environment may be generated based at least on a plurality of images of the real-world environment. In this example and/or other examples, the microphone array may be included in a mobile computing device, the mobile computing device may include a camera, and the plurality of images of the real-world environment may include images captured by the camera of the mobile computing device. In this example and/or other examples, the method may further comprise displaying a map of the real-world environment via a display of the mobile computing device, and the map may indicate the estimated origin of the audio impulse in the real-world environment. In this example and/or other examples, the plurality of images may include satellite images of the real world environment. In this example and/or other examples, the method may further comprise identifying, via a surface classification machine learning model, the materials of the real-world surfaces of the real-world structures and associated acoustic parameters based at least on analyzing the plurality of images of the real-world environment. In this example and/or other examples, the microphone array may include microphones included in a plurality of mobile computing devices having different real-world locations in the real world environment. In this example and/or other examples, the method may further comprise identifying, via an audio classification machine learning model, a source of the audio impulse selected from a plurality of different sources that generate different types of audio impulses having different acoustic signatures, such identification being based at least on analyzing the audio signals output by the microphone array, wherein the impulse response path of the audio impulse is simulated based at least on the acoustic signature of the audio impulse generated by the identified source, and wherein the simulation data includes the identified source of the audio impulse. In this example and/or other examples, the method may further comprise isolating an acoustic signature of the audio impulse in the audio signals to generate filtered audio signals, the impulse response path of the audio impulse may be simulated based at least on the filtered audio signals. In this example and/or other examples, the simulation data may include a lookup table that maps the audio signals characterizing the audio impulse, the locations in the real-world environment of the plurality of microphones in the microphone array, and the DRTF of the microphone array to the estimated origin of the audio impulse in the real-world environment. In this example and/or other examples, the simulated impulse response path of the audio impulse may include reflections of the audio impulse off virtual structures in the geometric computer model of the real-world environment, and the simulation data may include the reflections of the audio impulse. In this example and/or other examples, the method may further comprise instantiating an audio impulse localization application program that is configured to receive the audio signals, the locations of the plurality of microphones in the microphone array, and the DRTF of the microphone array, and calculate an origin of the audio impulse using a time difference of arrival (TDOA) algorithm based at least on the audio signals, the locations of the plurality of microphones in the microphone array, and the DRTF of the microphone array, based at least on the estimated output of the audio impulse included in the simulation data matching the origin of the audio impulse calculated by the audio impulse localization application program, outputting a notification indicating the origin of the audio impulse, and based at least on the estimated output of the audio impulse included in the simulation data deviating from the origin of the audio impulse calculated by the audio impulse localization application program, outputting a notification indicating that the origin of the audio impulse calculated by the audio localizer application program is actually a reflection of the audio impulse.

In another example, a computing system comprises a logic subsystem, and a storage subsystem holding instructions executable by the logic subsystem to receive audio signals from a microphone array including a plurality of microphones, wherein the audio signals characterize an audio impulse generated in a real-world environment, receive locations in a real-world environment of the plurality of microphones in the microphone array, recognize a device related transfer function (DRTF) of the microphone array, recognize a geometric computer model of the real-world environment, wherein the geometric computer model includes virtual structures that model real-world structures in the real-world environment, wherein the virtual structures include virtual surfaces that are assigned acoustic parameters based at least on materials that make up real-world surfaces of the real-world structures, simulate an impulse response path of the audio impulse throughout the geometric computer model of the real-world environment based at least on the audio signals, the locations in the real-world environment of the plurality of microphones in the microphone array, and the DRTF of the microphone array, wherein the impulse response path of the audio impulse is affected by interactions with different virtual surfaces in the geometric computer model based at least on the acoustic parameters of the different virtual surfaces, and output simulation data including an estimated origin of the audio impulse in the real-world environment based at least on the simulated impulse response path of the audio impulse. In this example and/or other examples, the geometric computer model of the real-world environment may be generated based at least on a plurality of images of the real-world environment, the computing system may further comprise a camera, and the plurality of images of the real-world environment may include images captured by the camera. In this example and/or other examples, the computing system may further comprise a display, and the storage subsystem may hold instructions executable by the logic subsystem to display a map of the real-world environment via the display, the map may indicate the estimated origin of the audio impulse in the real-world environment. In this example and/or other examples, the storage subsystem may hold instructions executable by the logic subsystem to identify, via a surface classification machine learning model, the materials of the real-world surfaces of the real-world structures and associated acoustic parameters based at least on analyzing the plurality of images of the real-world environment. In this example and/or other examples, the microphone array may include microphones included in a plurality of mobile computing devices having different real-world locations in the real world environment. In this example and/or other examples, the storage subsystem may hold instructions executable by the logic subsystem to identify, via an audio classification machine learning model, a source of the audio impulse selected from a plurality of different sources that generate different types of audio impulses having different acoustic signatures, such identification being based at least on analyzing the audio signals output by the microphone array, wherein the impulse response path of the audio impulse is simulated based at least on the acoustic signature of the audio impulse generated by the identified source, and wherein the simulation data includes the identified source of the audio impulse. In this example and/or other examples, the storage subsystem may hold instructions executable by the logic subsystem to isolate an acoustic signature of the audio impulse in the audio signals to generate filtered audio signals, the impulse response path of the audio impulse may be simulated based at least on the filtered audio signals.

In yet another example, a mobile computing device comprises a microphone array including a plurality of microphones, a display, a logic subsystem, and a storage subsystem holding instructions executable by the logic subsystem to receive audio signals from a microphone array including a plurality of microphones, wherein the audio signals characterize an audio impulse generated in a real-world environment, receive locations in a real-world environment of the plurality of microphones in the microphone array, recognize a device related transfer function (DRTF) of the microphone array, recognize a geometric computer model of the real-world environment, wherein the geometric computer model includes virtual structures that model real-world structures in the real-world environment, wherein the virtual structures include virtual surfaces that are assigned acoustic parameters based at least on materials that make up real-world surfaces of the real-world structures, simulate an impulse response path of the audio impulse throughout the geometric computer model of the real-world environment based at least on the audio signals, the locations in the real-world environment of the plurality of microphones in the microphone array, and the DRTF of the microphone array, wherein the impulse response path of the audio impulse is affected by interactions with different virtual surfaces in the geometric computer model based at least on the acoustic parameters of the different virtual surfaces, output simulation data including an estimated origin of the audio impulse in the real-world environment based at least on the simulated impulse response path of the audio impulse, and display a map of the real-world environment via the display, wherein the map indicates the estimated origin of the audio impulse in the real-world environment.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for estimating an origin of an audio impulse in a real-world environment performed by computing system, the method comprising:

receiving audio signals from a microphone array including a plurality of microphones, wherein the audio signals characterize the audio impulse generated in the real-world environment;

receiving locations in the real-world environment of the plurality of microphones in the microphone array;

recognizing a device related transfer function (DRTF) of the microphone array;

recognizing a geometric computer model of the real-world environment, wherein the geometric computer model includes virtual structures that model real-world structures in the real-world environment, wherein the virtual structures include virtual surfaces that are assigned acoustic parameters based at least on materials that make up real-world surfaces of the real-world structures;

simulating an impulse response path of the audio impulse throughout the geometric computer model of the real-world environment based at least on the audio signals, the locations in the real-world environment of the plurality of microphones in the microphone array, and the DRTF of the microphone array, wherein the impulse response path of the audio impulse is affected by interactions with different virtual surfaces in the geometric computer model based at least on the acoustic parameters of the different virtual surfaces; and outputting simulation data including an estimated origin of the audio impulse in the real-world environment based at least on the simulated impulse response path of the audio impulse.

2. The method of claim 1, wherein the geometric computer model of the real-world environment is generated based at least on a plurality of images of the real-world environment.

3. The method of claim 2, wherein the microphone array is included in a mobile computing device, wherein the mobile computing device includes a camera, and wherein the plurality of images of the real-world environment includes images captured by the camera of the mobile computing device.

4. The method of claim 3, further comprising:

displaying a map of the real-world environment via a display of the mobile computing device, and wherein the map indicates the estimated origin of the audio impulse in the real-world environment.

5. The method of claim 2, wherein the plurality of images includes satellite images of the real world environment.

6. The method of claim 2, further comprising:

identifying, via a surface classification machine learning model, the materials of the real-world surfaces of the real-world structures and associated acoustic parameters based at least on analyzing the plurality of images of the real-world environment.

7. The method of claim 1, wherein the microphone array includes microphones included in a plurality of mobile computing devices having different real-world locations in the real world environment.

8. The method of claim 1, further comprising:

identifying, via an audio classification machine learning model, a source of the audio impulse selected from a plurality of different sources that generate different types of audio impulses having different acoustic signatures, such identification being based at least on analyzing the audio signals output by the microphone array, wherein the impulse response path of the audio impulse is simulated based at least on the acoustic signature of the audio impulse generated by the identified source, and wherein the simulation data includes the identified source of the audio impulse.

9. The method of claim 1, further comprising:

isolating an acoustic signature of the audio impulse in the audio signals to generate filtered audio signals;

wherein the impulse response path of the audio impulse is simulated based at least on the filtered audio signals.

10. The method of claim 1, wherein the simulation data includes a lookup table that maps the audio signals characterizing the audio impulse, the locations in the real-world environment of the plurality of microphones in the microphone array, and the DRTF of the microphone array to the estimated origin of the audio impulse in the real-world environment.

11. The method of claim 1, wherein the simulated impulse response path of the audio impulse includes reflections of the audio impulse off virtual structures in the geometric computer model of the real-world environment, and wherein the simulation data includes the reflections of the audio impulse.

12. The method of claim 1, further comprising:

instantiating an audio impulse localization application program that is configured to:

receive the audio signals, the locations of the plurality of microphones in the microphone array, and the DRTF of the microphone array, and calculate an origin of the audio impulse using a time difference of arrival (TDOA) algorithm based at least on the audio signals, the locations of the plurality of microphones in the microphone array, and the DRTF of the microphone array;

based at least on the estimated output of the audio impulse included in the simulation data matching the origin of the audio impulse calculated by the audio impulse localization application program, outputting a notification indicating the origin of the audio impulse; and based at least on the estimated output of the audio impulse included in the simulation data deviating from the origin of the audio impulse calculated by the audio impulse localization application program, outputting a notification indicating that the origin of the audio impulse calculated by the audio localizer application program is actually a reflection of the audio impulse.

13. A computing system comprising:

a logic subsystem; and a storage subsystem holding instructions executable by the logic subsystem to:

receive audio signals from a microphone array including a plurality of microphones, wherein the audio signals characterize an audio impulse generated in a real-world environment;

receive locations in a real-world environment of the plurality of microphones in the microphone array;

recognize a device related transfer function (DRTF) of the microphone array;

recognize a geometric computer model of the real-world environment, wherein the geometric computer model includes virtual structures that model real-world structures in the real-world environment, wherein the virtual structures include virtual surfaces that are assigned acoustic parameters based at least on materials that make up real-world surfaces of the real-world structures;

simulate an impulse response path of the audio impulse throughout the geometric computer model of the real-world environment based at least on the audio signals, the locations in the real-world environment of the plurality of microphones in the microphone array, and the DRTF of the microphone array, wherein the impulse response path of the audio impulse is affected by interactions with different virtual surfaces in the geometric computer model based at least on the acoustic parameters of the different virtual surfaces; and output simulation data including an estimated origin of the audio impulse in the real-world environment based at least on the simulated impulse response path of the audio impulse.

14. The computing system of claim 13, wherein the geometric computer model of the real-world environment is generated based at least on a plurality of images of the real-world environment, wherein the computing system further comprises a camera, and wherein the plurality of images of the real-world environment includes images captured by the camera.

15. The computing system of claim 13, further comprising:

a display; and wherein the storage subsystem holds instructions executable by the logic subsystem to:

display a map of the real-world environment via the display, wherein the map indicates the estimated origin of the audio impulse in the real-world environment.

16. The computing system of claim 13, wherein the storage subsystem holds instructions executable by the logic subsystem to:

identify, via a surface classification machine learning model, the materials of the real-world surfaces of the real-world structures and associated acoustic parameters based at least on analyzing the plurality of images of the real-world environment.

17. The computing system of claim 13, wherein the microphone array includes microphones included in a plurality of mobile computing devices having different real-world locations in the real world environment.

18. The computing system of claim 13, wherein the storage subsystem holds instructions executable by the logic subsystem to:

identify, via an audio classification machine learning model, a source of the audio impulse selected from a plurality of different sources that generate different types of audio impulses having different acoustic signatures, such identification being based at least on analyzing the audio signals output by the microphone array, wherein the impulse response path of the audio impulse is simulated based at least on the acoustic signature of the audio impulse generated by the identified source, and wherein the simulation data includes the identified source of the audio impulse.

19. The computing system of claim 13, wherein the storage subsystem holds instructions executable by the logic subsystem to:

isolate an acoustic signature of the audio impulse in the audio signals to generate filtered audio signals;

wherein the impulse response path of the audio impulse is simulated based at least on the filtered audio signals.

20. A mobile computing device comprising:

a microphone array including a plurality of microphones;

a display;

a logic subsystem; and a storage subsystem holding instructions executable by the logic subsystem to:

receive audio signals from a microphone array including a plurality of microphones, wherein the audio signals characterize an audio impulse generated in a real-world environment;

receive locations in a real-world environment of the plurality of microphones in the microphone array;

recognize a device related transfer function (DRTF) of the microphone array;

recognize a geometric computer model of the real-world environment, wherein the geometric computer model includes virtual structures that model real-world structures in the real-world environment, wherein the virtual structures include virtual surfaces that are assigned acoustic parameters based at least on materials that make up real-world surfaces of the real-world structures;

simulate an impulse response path of the audio impulse throughout the geometric computer model of the real-world environment based at least on the audio signals, the locations in the real-world environment of the plurality of microphones in the microphone array, and the DRTF of the microphone array, wherein the impulse response path of the audio impulse is affected by interactions with different virtual surfaces in the geometric computer model based at least on the acoustic parameters of the different virtual surfaces;

output simulation data including an estimated origin of the audio impulse in the real-world environment based at least on the simulated impulse response path of the audio impulse; and display a map of the real-world environment via the display, wherein the map indicates the estimated origin of the audio impulse in the real-world environment.

\* \* \* \* \*